US010774432B2

(12) United States Patent
Shyu

(10) Patent No.: US 10,774,432 B2
(45) Date of Patent: Sep. 15, 2020

(54) HYDROGEN MOLECULE REMIXING DEVICE OF DISH-SHAPED ELECTROLYTIC CELL

(71) Applicant: Wen-Shing Shyu, Taichung (TW)

(72) Inventor: Wen-Shing Shyu, Taichung (TW)

( * ) Notice: Subject to any disclaimer, the term of this patent is extended or adjusted under 35 U.S.C. 154(b) by 309 days.

(21) Appl. No.: 15/980,844

(22) Filed: May 16, 2018

(65) Prior Publication Data

US 2019/0352788 A1 Nov. 21, 2019

(51) Int. Cl.
| | |
|---|---|
| *C25B 15/08* | (2006.01) |
| *C25B 1/10* | (2006.01) |
| *C25B 11/03* | (2006.01) |
| *C02F 1/461* | (2006.01) |
| *C25B 9/08* | (2006.01) |
| *B01F 5/06* | (2006.01) |
| *B01F 3/04* | (2006.01) |

(52) U.S. Cl.
CPC .......... *C25B 15/08* (2013.01); *B01F 3/04503* (2013.01); *B01F 5/0605* (2013.01); *C02F 1/4618* (2013.01); *C25B 1/10* (2013.01); *C25B 9/08* (2013.01); *C25B 11/03* (2013.01); *B01F 2215/008* (2013.01)

(58) Field of Classification Search
None
See application file for complete search history.

(56) References Cited

U.S. PATENT DOCUMENTS 4,125,439 A * 11/1978 Fleischmann ....... C02F 1/46104
204/212

7,833,390 B2 * 11/2010 Shyu .................. C25B 9/06
204/252
2007/0267296 A1 * 11/2007 Shyu .................. C25B 9/08
204/627
2009/0159461 A1 * 6/2009 McCutchen ........... C02F 1/34
205/751
2009/0200176 A1 * 8/2009 McCutchen ........... C25B 1/13
205/494
2012/0031754 A1 * 2/2012 Shyu .................. C25B 9/00
204/278.5

(Continued)

FOREIGN PATENT DOCUMENTS

EP 3569738 A1 * 11/2019 ............... C25B 1/10

OTHER PUBLICATIONS

EPO Search Opinion in EP3569738A1, dated Nov. 28, 2018 (Year: 2018).*

*Primary Examiner* — Harry D Wilkins, III
(74) *Attorney, Agent, or Firm* — Alan D. Kamrath; Karin L. Williams; Mayer & Williams PC

(57) ABSTRACT

A hydrogen molecule remixing device includes a base, a first gas and water channelling disc, an anode, a cathode, an ion membrane, a second gas and water channelling disc, a cover, a cationic water outlet connector and a connector. In practice, the source water is electrolyzed in the anode cavities of the anode to form oxygen molecules, ozone and anionic water, and electrolyzed in the cathode cavities of the cathode to form hydrogen molecules and cationic water. The hydrogen molecules are carried by the cationic water into the collecting and guiding chambers of the second gas and water channelling disc, so that the hydrogen molecules and the cationic water produce a blending reaction, and more hydrogen molecules are dissolved into the cationic water.

16 Claims, 13 Drawing Sheets

(56) References Cited

U.S. PATENT DOCUMENTS

| | | | |
|---|---|---|---|
| 2012/0193221 A1* | 8/2012 | McCutchen | F01N 1/18 204/242 |
| 2015/0129419 A1* | 5/2015 | Sekiguchi | C25B 1/13 204/252 |
| 2016/0122885 A1* | 5/2016 | Ishikawa | C25B 13/08 204/257 |
| 2016/0130708 A1* | 5/2016 | Daimon | C25B 1/12 204/257 |
| 2017/0247800 A1* | 8/2017 | Lacroix | C25B 9/18 |
| 2019/0352788 A1* | 11/2019 | Shyu | C25B 15/08 |

* cited by examiner

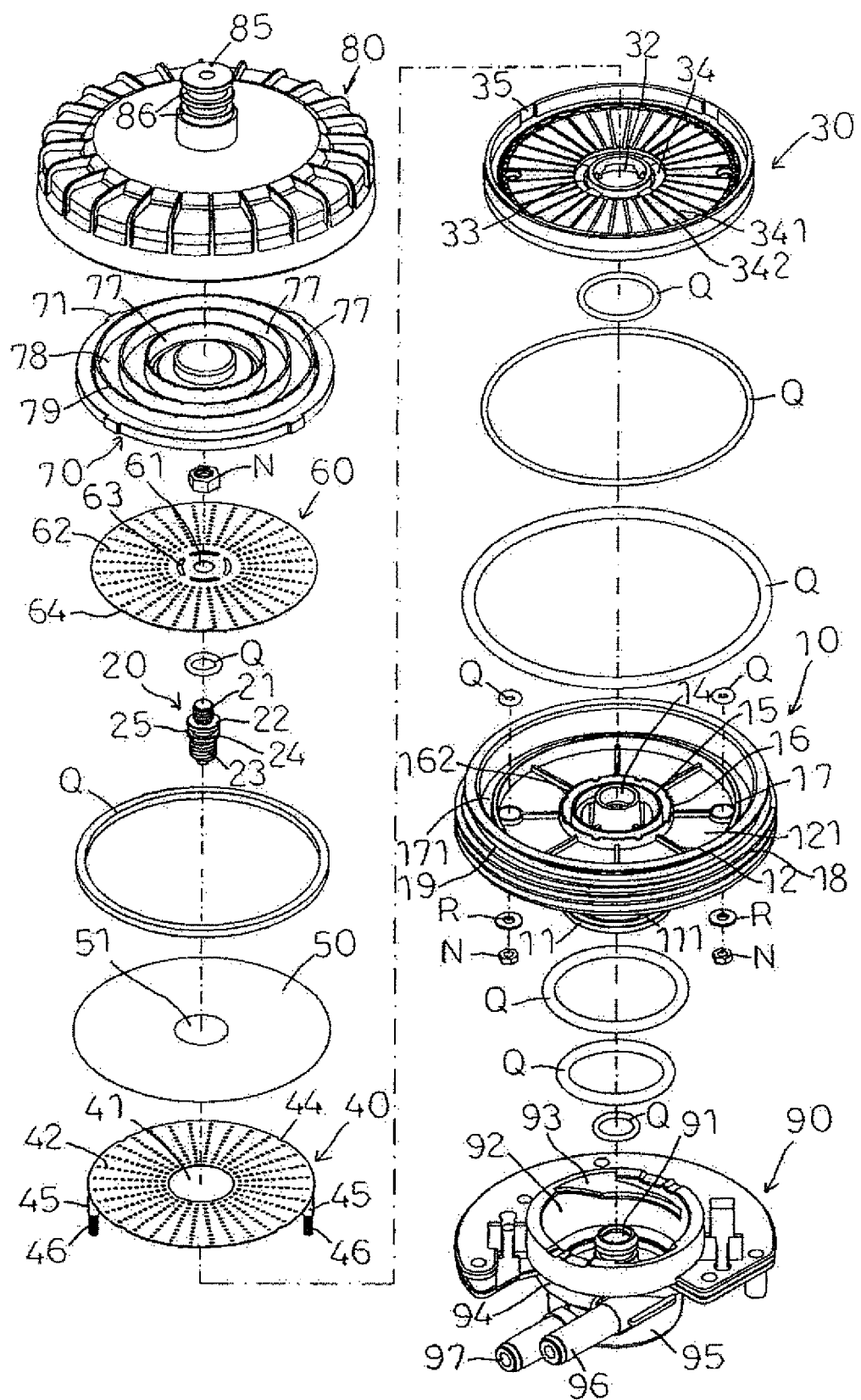
FIG·13

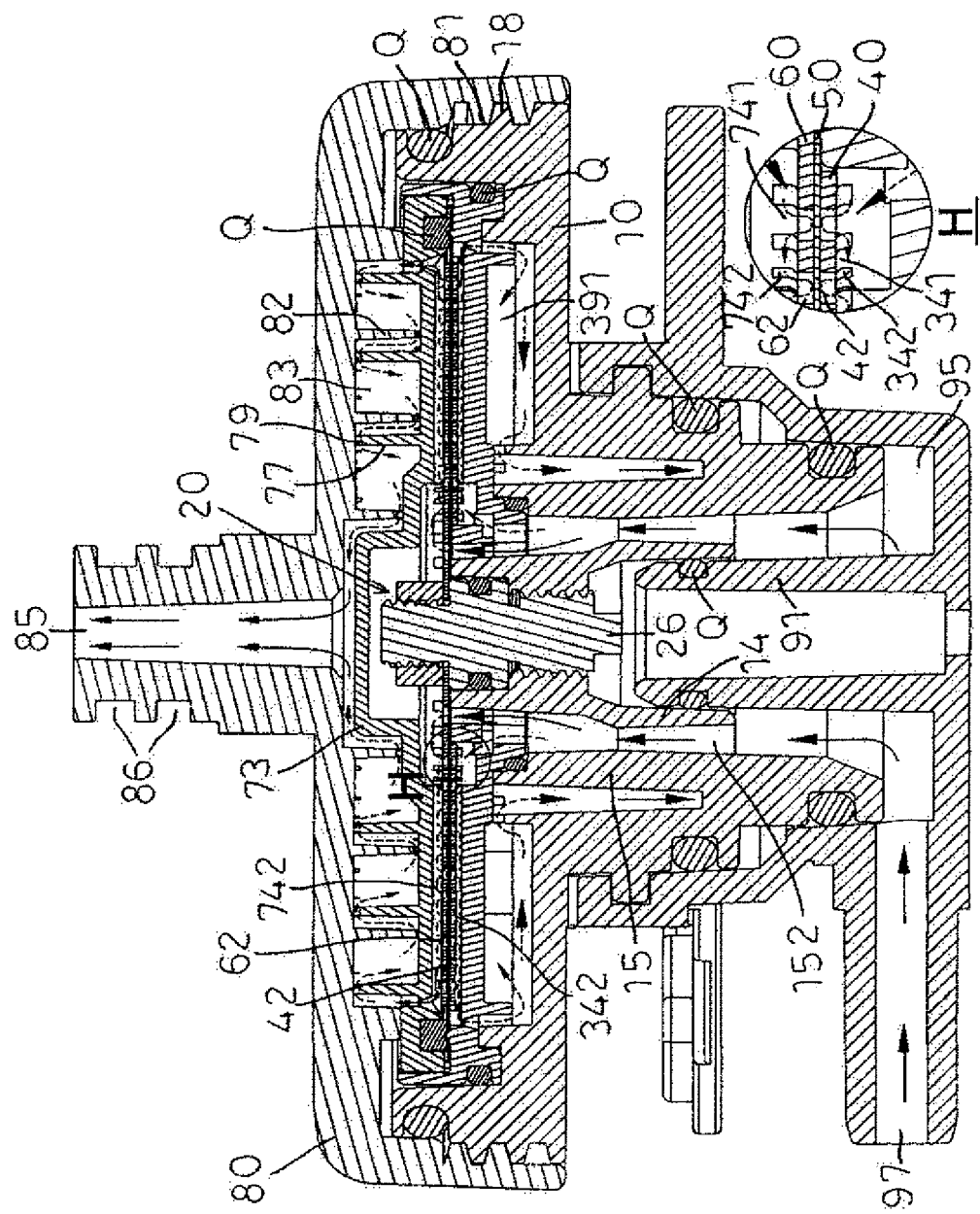
FIG·14

HYDROGEN MOLECULE REMIXING DEVICE OF DISH-SHAPED ELECTROLYTIC CELL

BACKGROUND OF THE INVENTION

1. Field of the Invention

The present invention relates to a remixing device and, more particularly, to a hydrogen molecule remixing device of a dish-shaped electrolytic cell.

2. Description of the Related Art

An electrolyzing device is used to electrolyze water. In practice, the source water is electrolyzed in the anode to form oxygen molecules, ozone and anionic water, and is electrolyzed in the cathode to form hydrogen molecules (or negative hydrogen ions) and cationic water. However, the hydrogen molecules are not dissolved in the water easily.

A first conventional electrolyzing device comprises circular, rectangular or net-shaped electrodes. The cationic water flow channels are arranged on the surface of the cathode, and the anionic water flow channels are arranged on the surface of the anode, so that multiple recessed portions are formed in the electrodes, thereby forming a stagnation zone. Thus, the hydrogen molecules easily gather in the stagnation zone and form larger bubbles, so that the hydrogen molecules cannot be dissolved in the cationic water, thereby decreasing the contents of the hydrogen molecules in the cationic water.

A second conventional electrolyzing device comprises a static hydrogen water electrolytic cup. The anode has a lower portion formed with an anode chamber, and the cathode has an upper portion formed with a cathode chamber. An ion membrane is placed between the anode chamber and the cathode chamber and is provided with multiple holes. The hydrogen molecules are gathered above the cathode and form air bubbles which are lifted rapidly above the electrolytic cup, so that the hydrogen molecules produced in the cathode are not exactly dissolved in the cationic water, thereby decreasing the contents of the hydrogen molecules in the cationic water. In addition, the oxygen molecules produced under the anode cannot be introduced smoothly so that the oxygen molecules easily stay in the cavities under the anode, thereby increasing the impedance of the electrodes. Further, the electrolyzing liquid is introduced from the cup above the cathode through the holes into the anode chamber. The holes extend through the anode chamber and cathode chamber. However, when the holes are too small, the electrolyzing liquid is not easily introduced into the anode chamber, and when the holes are too large, the oxygen molecules, ozone are easily introduced into the cationic water, thereby causing pollution. Further, the ion membrane has to be wet fully for operation, so that the ion membrane needs to rest when the electrolysis process is operated during a determined period of time.

A third conventional electrolyzing device comprises a low water electrolytic cell whose electrodes are arranged in an upright manner. The electrodes are respectively located at the left side and right side of the electrolytic cell. The electrolytic cell has a lower end provided with a water inlet port and an upper end provided with a water outlet port, so that the water flows from bottom to top. However, the hydrogen molecules in the cathode chamber are rapidly carried upward by the cationic water. Thus, the cationic water is introduced outward from the electrolytic cell and is delivered into an air chamber to enhance the contents of the hydrogen molecules. However, the air chamber occupies a larger space and increases the cost.

BRIEF SUMMARY OF THE INVENTION

The primary objective of the present invention is to provide a hydrogen molecule remixing device that efficiently enhances concentration of the hydrogen molecules in the water.

In accordance with the present invention, there is provided a hydrogen molecule remixing device comprising a base, a first gas and water channelling disc located above the base, an anode located above the first gas and water channelling disc, a cathode located above the anode, an ion membrane located between the anode and the cathode, a second gas and water channelling disc located above the cathode, a cover combined with the base and located above the second gas and water channelling disc, a cationic water outlet connector extending upward from the cover, and a connector extending downward from the base. The first gas and water channelling disc is provided with a first collecting and guiding chamber corresponding to the base. The second gas and water channelling disc is provided with a plurality of second collecting and guiding chambers corresponding to the cover. The anode is provided with a plurality of first water inlet ports and a plurality of anode cavities. The anode cavities are arranged in a radiating manner. The cathode is provided with a plurality of second water inlet ports and a plurality of cathode cavities. The cathode cavities are arranged in a radiating manner. The connector is provided with a source water input joint and an anionic water output joint. In practice, source water is respectively guided through the first water inlet ports of the anode and the second water inlet ports of the cathode into the anode cavities of the anode and the cathode cavities of the cathode. The source water is electrolyzed in the anode cavities of the anode to form oxygen molecules, ozone and anionic water, and is electrolyzed in the cathode cavities of the cathode to form hydrogen molecules and cationic water. The oxygen molecules and ozone in the anode cavities of the anode are carried by the anionic water into the first collecting and guiding chamber of the first gas and water channelling disc. The hydrogen molecules in the cathode cavities of the cathode are carried by the cationic water into the second collecting and guiding chambers of the second gas and water channelling disc, so that the hydrogen molecules and the cationic water produce an blending reaction in the second collecting and guiding chambers, and more hydrogen molecules are dissolved into the cationic water, to increase a concentration of the hydrogen molecules in the cationic water.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

Figure 1:
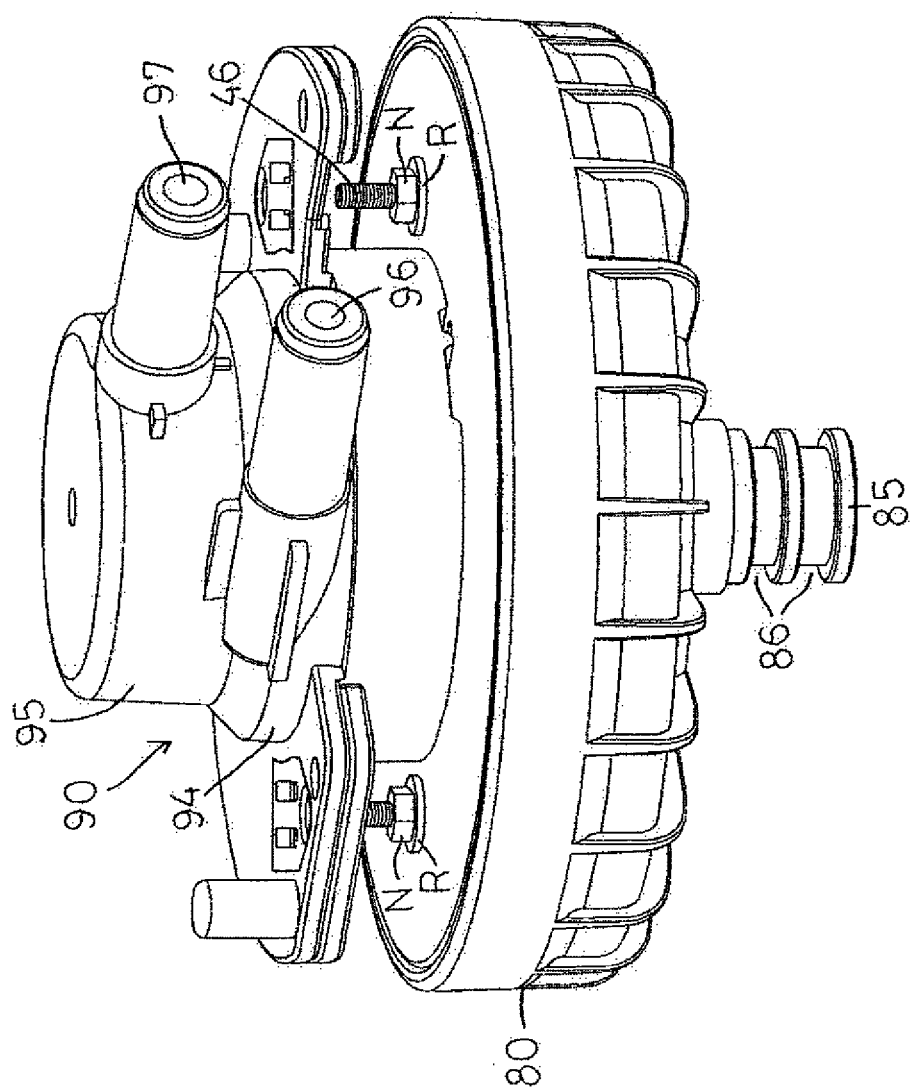
FIG. 1 is a bottom perspective view of a hydrogen molecule remixing device in accordance with the preferred embodiment of the present invention.
Figure 2:
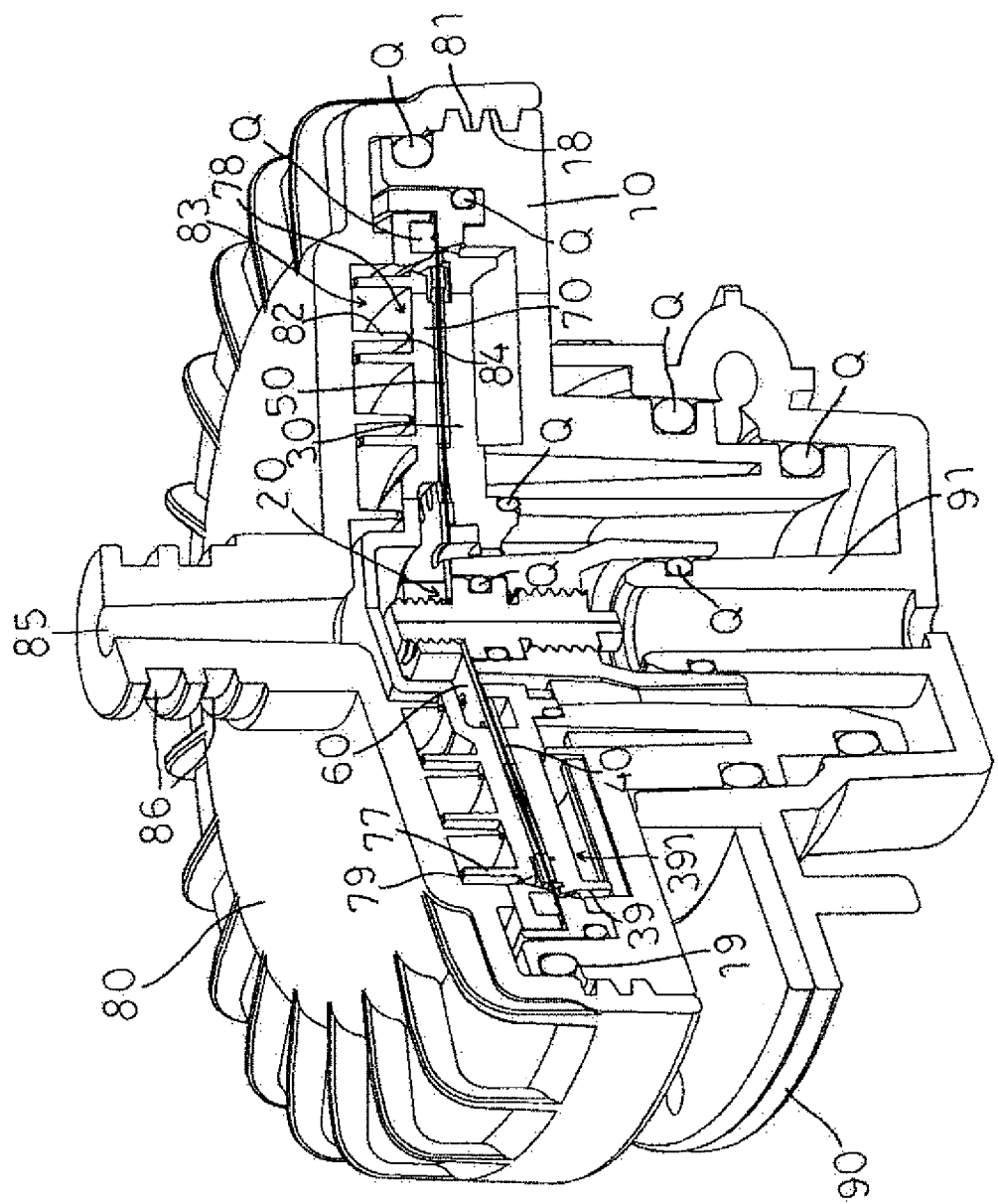
FIG. 2 is a perspective cross-sectional view of the hydrogen molecule remixing device in accordance with the preferred embodiment of the present invention.
Figure 3:
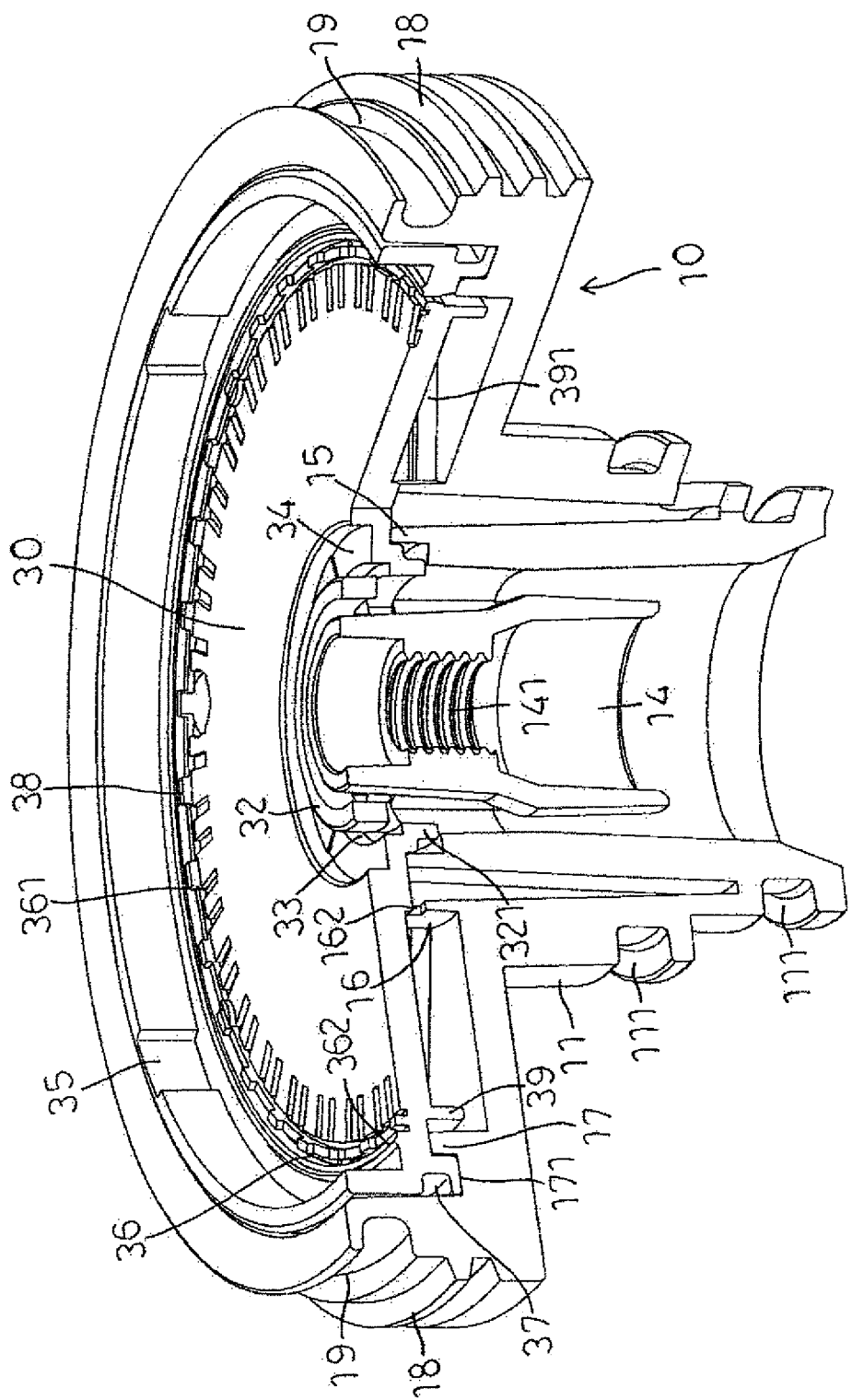
FIG. 3 is a partially perspective cross-sectional view of the hydrogen molecule remixing device in accordance with the preferred embodiment of the present invention.
Figure 4:
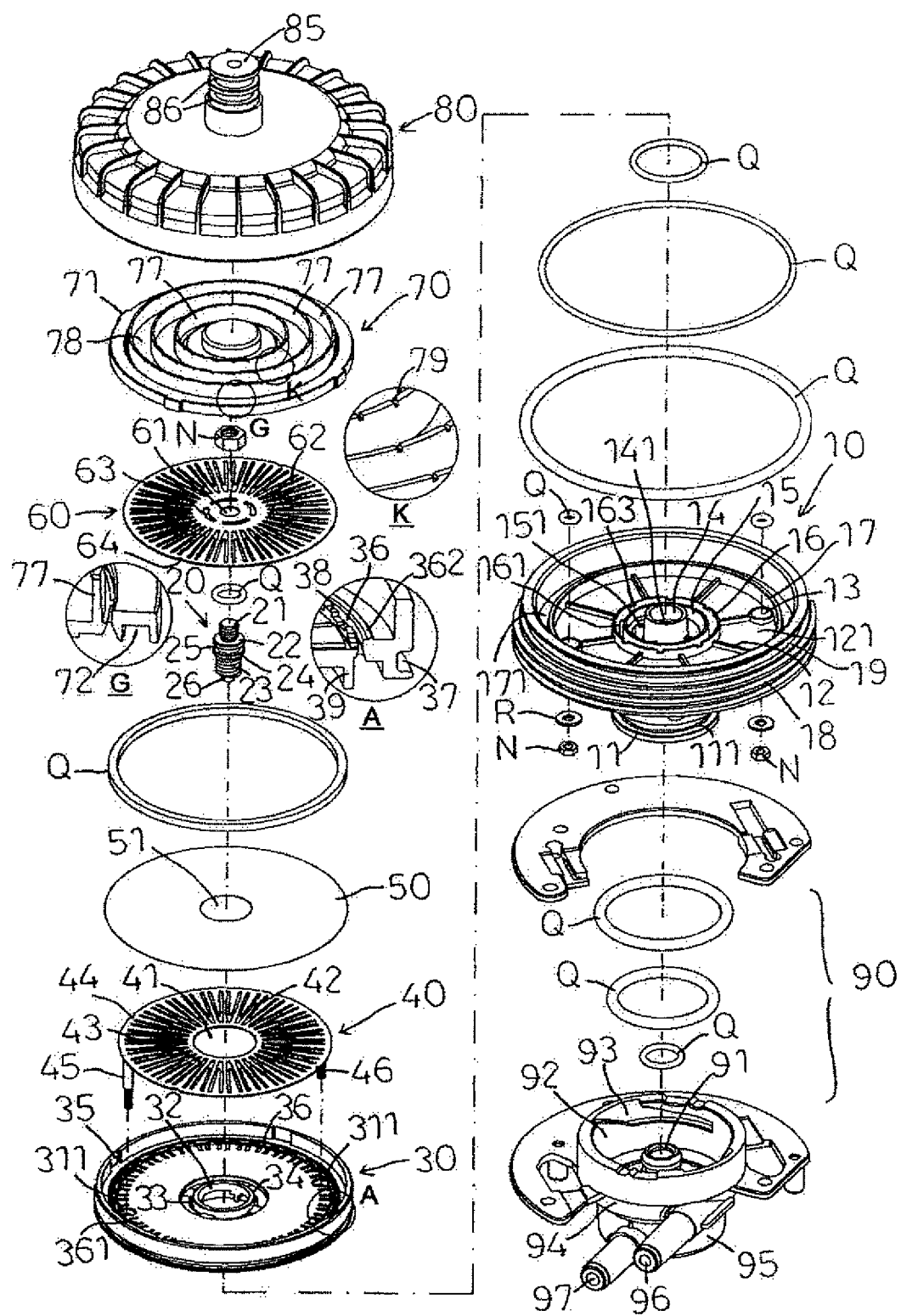

FIG. 4 includes an exploded perspective view, and locally enlarged views taken along circles "A", "K" and "G", of the hydrogen molecule remixing device in accordance with the preferred embodiment of the present invention.

Figure 5:
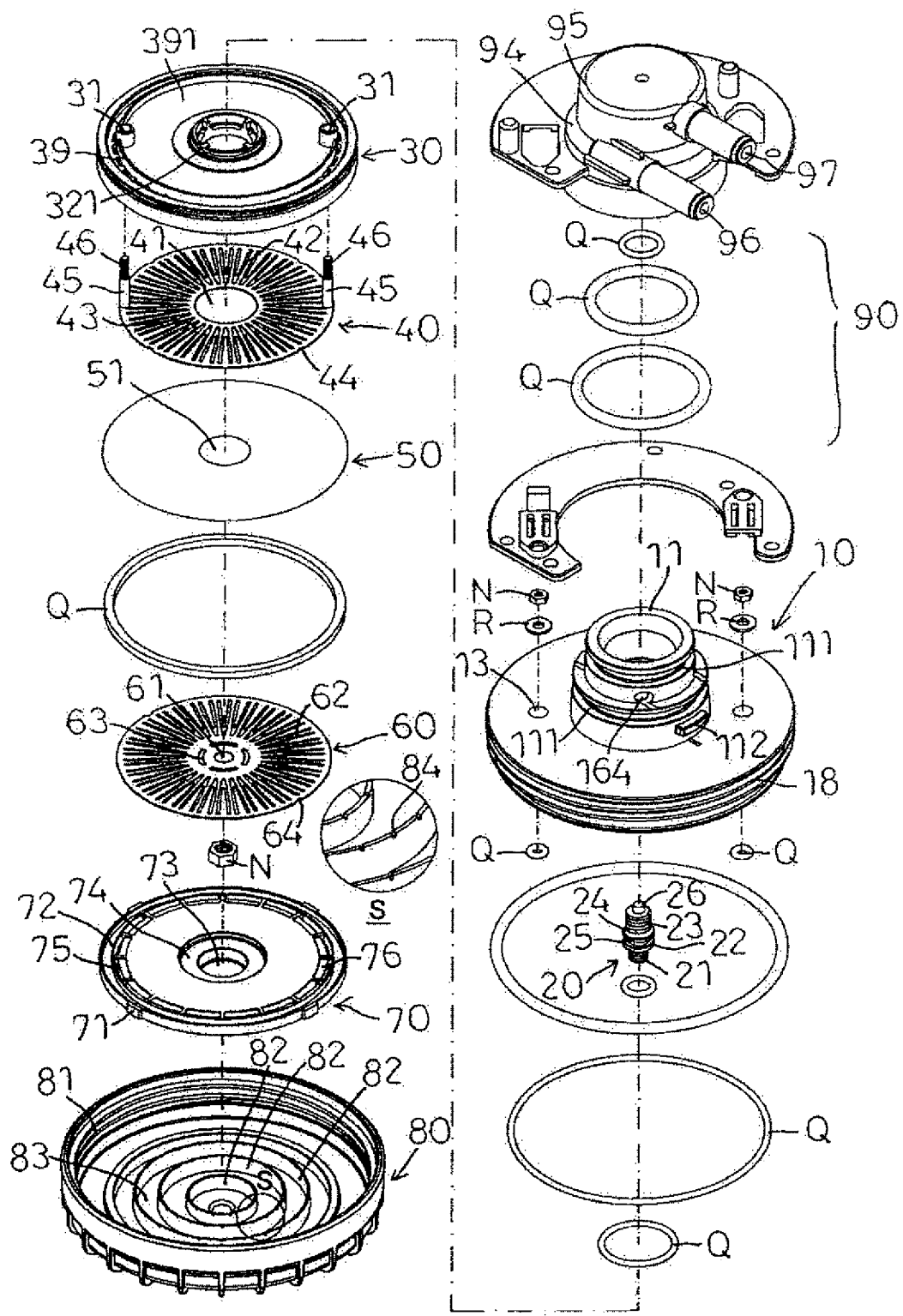

FIG. 5 includes an exploded perspective view and a locally enlarged view taken along circle "S", of the hydrogen molecule remixing device in accordance with the preferred embodiment of the present invention.

Figure 6:
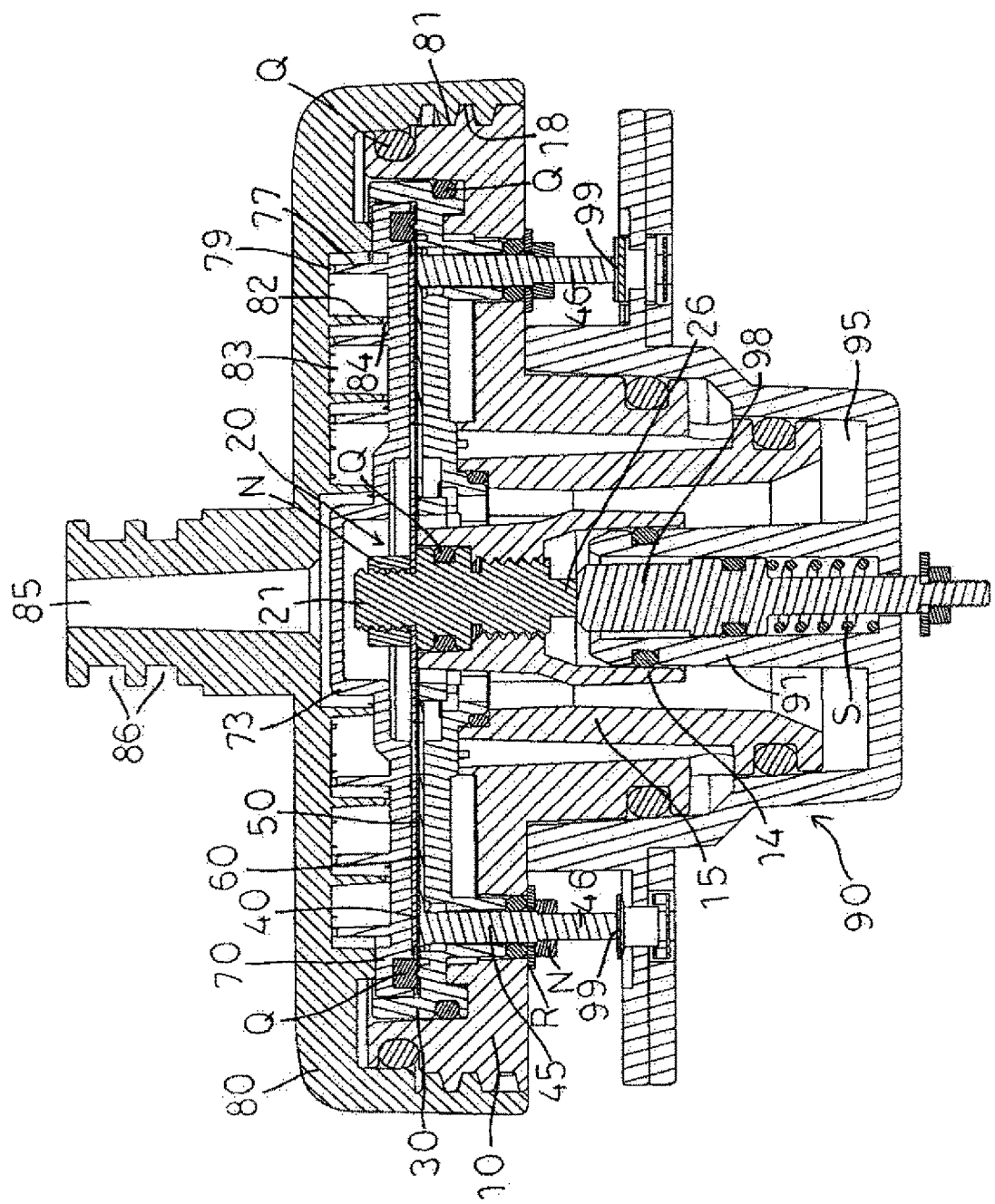

FIG. 6 is a cross-sectional view of the hydrogen molecule remixing device in accordance with the preferred embodiment of the present invention.

Figure 7:
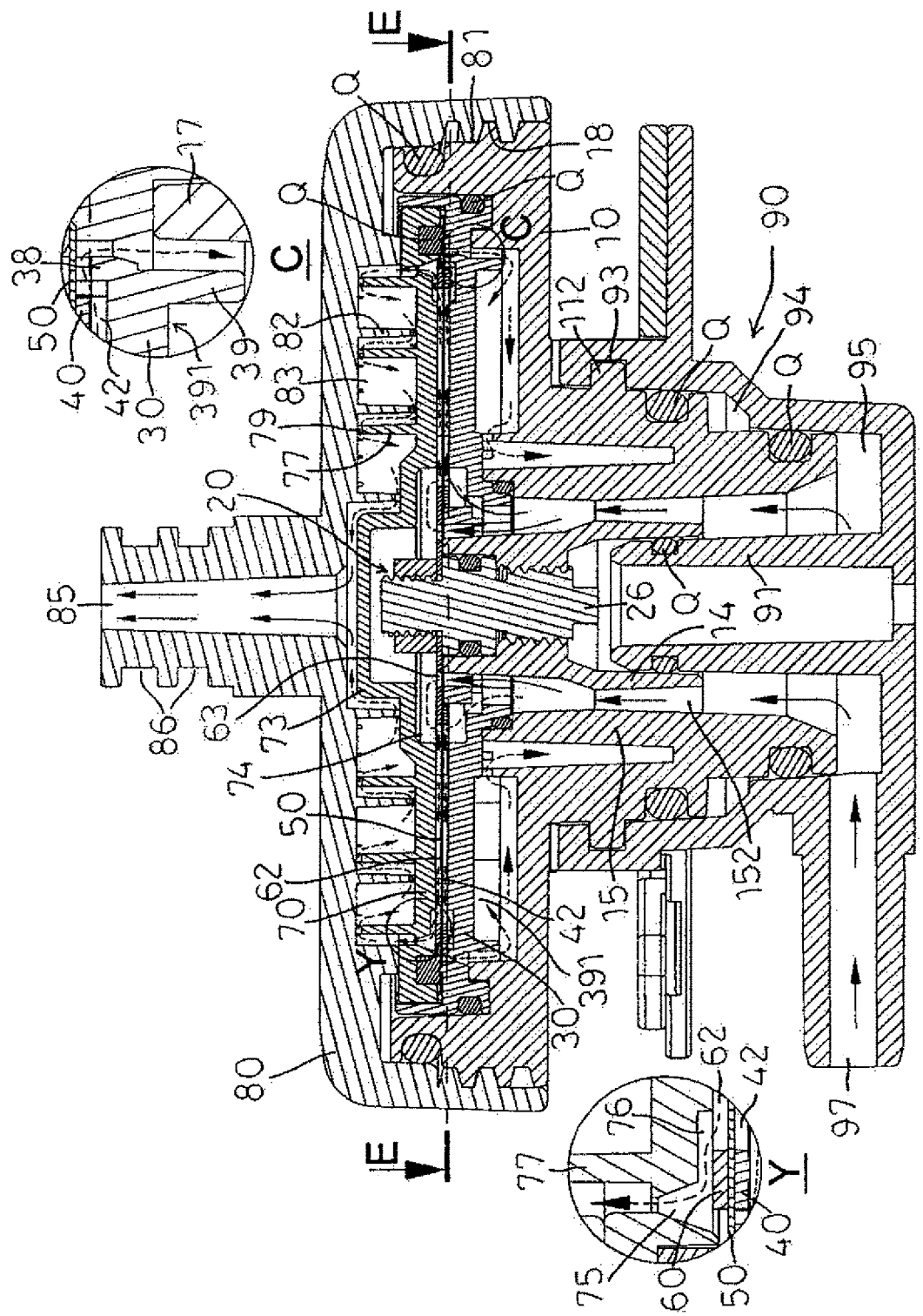

FIG. 7 includes a cross-sectional view, and locally enlarged views taken along circles "C" and "Y", of the hydrogen molecule remixing device in accordance with the preferred embodiment of the present invention.

Figure 8:
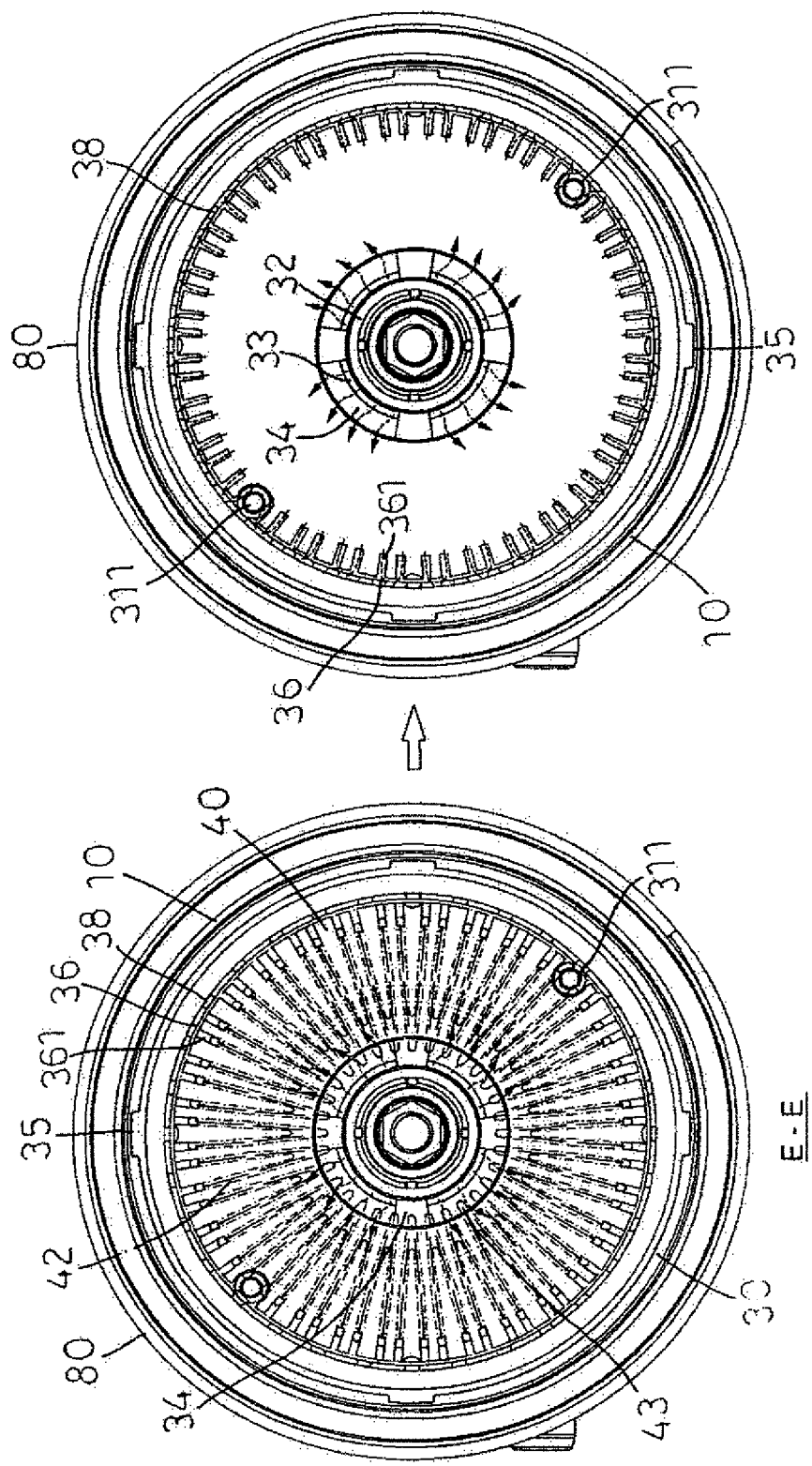

FIG. 8 is a cross-sectional view of the hydrogen molecule remixing device taken along line E-E as shown in FIG. 7.

Figure 9:
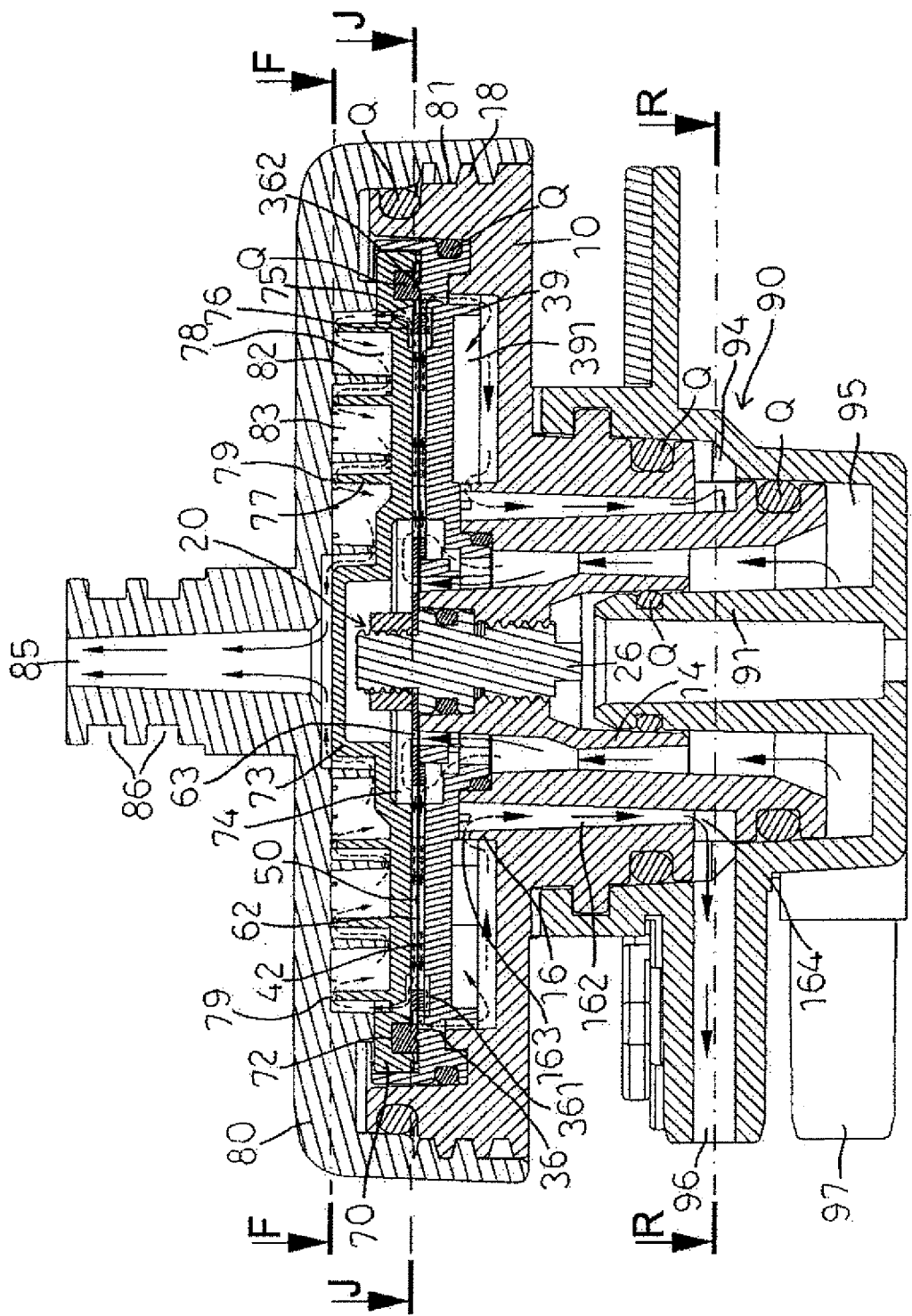

FIG. 9 is another cross-sectional view of the hydrogen molecule remixing device in accordance with the preferred embodiment of the present invention.

Figure 10:
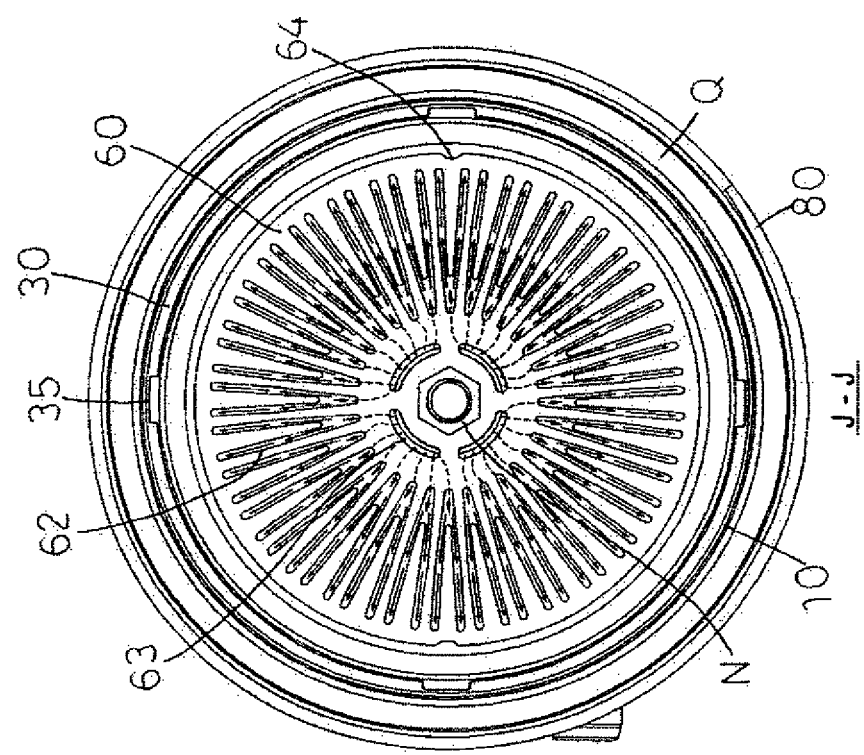

FIG. 10 is a cross-sectional view of the hydrogen molecule remixing device taken along line J-J as shown in FIG. 9.

Figure 11:
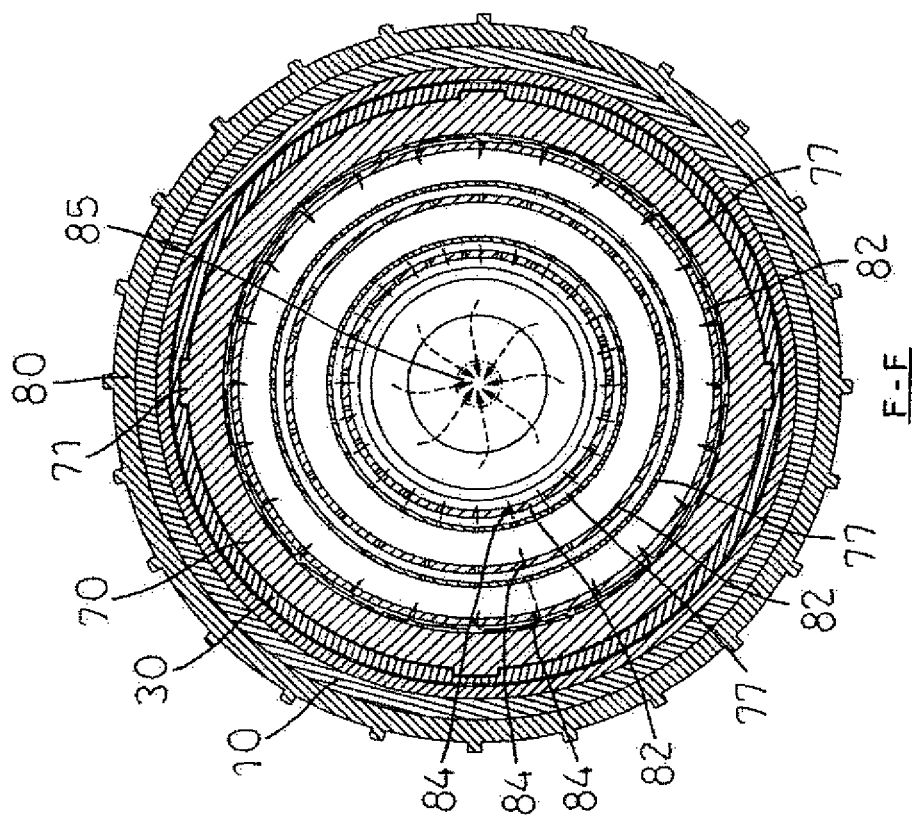

FIG. 11 is a cross-sectional view of the hydrogen molecule remixing device taken along line F-F as shown in FIG. 9.

Figure 12:
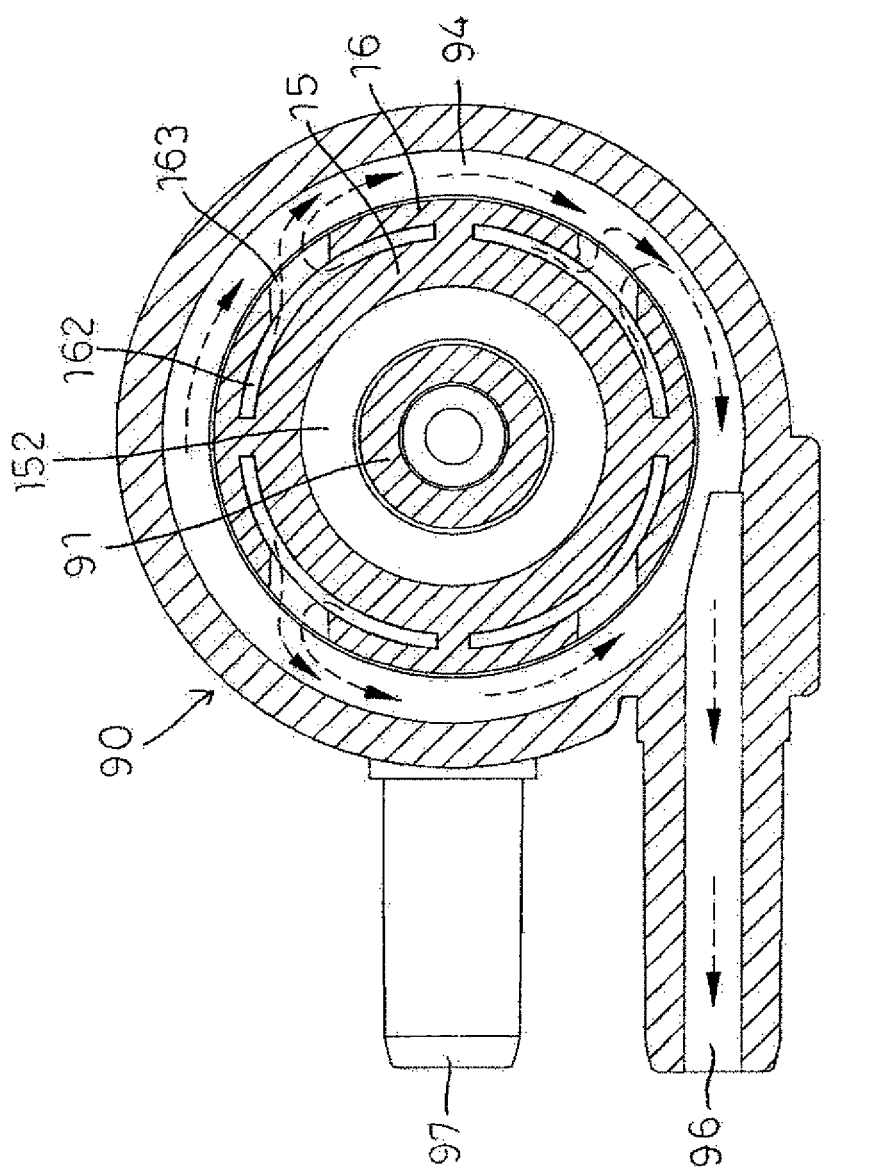

FIG. 12 is a cross-sectional view of the hydrogen molecule remixing device taken along line R-R as shown in FIG. 9.

FIG. 13 is an exploded perspective view of a hydrogen molecule remixing device in accordance with another preferred embodiment of the present invention.

FIG. 14 includes a cross-sectional view, and a locally enlarged view taken along circle "H", of the hydrogen molecule remixing device in accordance with another preferred embodiment of the present invention.

DETAILED DESCRIPTION OF THE INVENTION

Referring to the drawings and initially to FIGS. 1-6, a hydrogen molecule remixing device in accordance with the preferred embodiment of the present invention comprises a base 10, a first gas and water channelling disc 30 located above the base 10, an anode 40 located above the first gas and water channelling disc 30, a cathode 60 located above the anode 40, an ion membrane 50 located between the anode 40 and the cathode 60, a second gas and water channelling disc 70 located above the cathode 60, a cover 80 combined with the base 10 and located above the second gas and water channelling disc 70, a cationic water outlet connector 85 extending upward from the cover 80, and a connector 90 extending downward from the base 10.

The base 10 and the cover 80 have a disk shape. The first gas and water channelling disc 30, the anode 40, the ion membrane 50, the cathode 60 and the second gas and water channelling disc 70 are arranged between the base 10 and the cover 80.

The first gas and water channelling disc 30 has a disk shape and is provided with a first collecting and guiding chamber 391 corresponding to the base 10.

The second gas and water channelling disc 70 has a disk shape and is provided with a plurality of second collecting and guiding chambers 78 corresponding to the cover 80.

The anode 40 has a disk shape and is provided with a plurality of first water inlet ports 43 and a plurality of anode cavities 42. The anode cavities 42 are arranged in a radiating manner. The source water is guided through the first water inlet ports 43 into the anode cavities 42 of the anode 40.

The cathode 60 has a disk shape and is provided with a plurality of second water inlet ports 63 and a plurality of cathode cavities 62. The cathode cavities 62 are arranged in a radiating manner. The shape, size and position of the cathode cavities 62 of the cathode 60 are the same as that of the anode cavities 42 of the anode 40. The source water is guided through the second water inlet ports 63 into the cathode cavities 62 of the cathode 60.

The connector 90 is provided with a source water input joint 97 and an anionic water output joint 96. The connector 90 includes a source water inlet chamber 95 and an anionic water exit chamber 94. The source water inlet chamber 95 has a diameter smaller than that of the anionic water exit chamber 94. The source water input joint 97 is connected to and protrudes from the source water inlet chamber 95, and the anionic water output joint 96 is connected to and protrudes from the anionic water exit chamber 94. The anionic water output joint 96 is connected with a anionic water outlet hose (not shown).

In practice, the source water is respectively guided through the first water inlet ports 43 of the anode 40 and the second water inlet ports 63 of the cathode 60 into the anode cavities 42 of the anode 40 and the cathode cavities 62 of the cathode 60. The source water is a solution that has not been electrolyzed. The source water is electrolyzed in the anode cavities 42 of the anode 40 to form oxygen molecules, ozone and anionic water, and is electrolyzed in the cathode cavities 62 of the cathode 60 to form hydrogen molecules and cationic water. The oxygen molecules and ozone in the anode cavities 42 of the anode 40 are carried by the anionic water into the first collecting and guiding chamber 391 of the first gas and water channelling disc 30. The hydrogen molecules in the cathode cavities 62 of the cathode 60 are carried by the cationic water into the second collecting and guiding chambers 78 of the second gas and water channelling disc 70, so that the hydrogen molecules and the cationic water produce an blending reaction in the second collecting and guiding chambers 78, and more hydrogen molecules are dissolved into the cationic water, to increase the concentration of the hydrogen molecules in the cationic water.

In the preferred embodiment of the present invention, polarities of the anode 40 and the cathode 60 are interchanged.

In the preferred embodiment of the present invention, the base 10 has a top provided with a plurality of partitions 12 which are arranged in a radiating manner, and a plurality of anionic water flow paths 121 located between the partitions 12. The base 10 is provided with a conductive spacing tube 14, a first spacing ring 15 surrounding the conductive spacing tube 14, and a second spacing ring 16 surrounding the first spacing ring 15. The base 10 is provided with a plurality of first spacing ribs 151 located between the first spacing ring 15 and the conductive spacing tube 14 and forming a plurality of source water inlet paths 152 in the first spacing ring 15, and a plurality of second spacing ribs 161 located between the second spacing ring 16 and the first spacing ring 15 and forming a plurality of anionic water outlet paths 162 in the second spacing ring 16. The second spacing ring 16 is provided with a plurality of anionic water outlet ports 163 corresponding to the anionic water flow paths 121. The anionic water outlet paths 162 have a bottom provided with a plurality of anionic water outlet holes 164.

In the preferred embodiment of the present invention, the top of the base 10 is provided with an annular flange 17 surrounding the partitions 12, and a connecting groove 171 is formed between an inner wall of the base 10 and the annular flange 17 for connecting the first gas and water channelling disc 30. The first gas and water channelling disc 30 has an outer wall provided with an annular groove 37 corresponding to the connecting groove 171 of the base 10, and an O-ring "Q" is compressed between the connecting groove 171 of the base 10 and the annular groove 37 of the first gas and water channelling disc 30, to prevent the cationic water and the anionic water from being mixed.

In the preferred embodiment of the present invention, the base 10 is provided with a mounting protrusion 11 extending downward for mounting the connector 90. The mounting protrusion 11 of the base 10 is provided with at least one tenon 112. The connector 90 is provided with a mounting recess 92 mounted on the mounting protrusion 11 of the base 10. The mounting recess 92 of the connector 90 is provided with at least one mortise 93 locked onto the tenon 112 of the mounting protrusion 11 by rotation, so that the connector 90 is locked onto or unlocked from the base 10 quickly. The mounting protrusion 11 of the base 10 is provided with two grooves 111 for mounting two O-rings "Q". The anionic water outlet holes 164 correspond to a periphery of the mounting protrusion 11.

In the preferred embodiment of the present invention, the base 10 is provided with an external thread 18, and the cover 80 is provided with an internal thread 81 screwed onto the external thread 18 of the base 10. The base 10 is provided with an annular groove 19 located above the external thread 18, and an O-ring "Q" is retained in the annular groove 19 of the base 10 and compressed between the base 10 and the cover 80.

In the preferred embodiment of the present invention, the anode 40 has a periphery provided with a plurality of first positioning portions 44, and the cathode 60 has a periphery provided with a plurality of second positioning portions 64 located on the first positioning portions 44 of the anode 40 to align the anode cavities 42 of the anode 40 with the cathode cavities 62 of the cathode 60, so that the anode 40 aligns with the cathode 60.

In the preferred embodiment of the present invention, the cover 80 is provided with a plurality of first stop flanges 82 forming a plurality of hydrogen dissolving chambers 83 in the cover 80, and the second gas and water channelling disc 70 is provided with a plurality of second stop flanges 77 forming the second collecting and guiding chambers 78 in the second gas and water channelling disc 70. The first stop flanges 82 of the cover 80 and the second stop flanges 77 of the second gas and water channelling disc 70 have an annular shape and are arranged alternatingly. Each of the first stop flanges 82 of the cover 80 is provided with a plurality of first openings 84 to collect the hydrogen molecules and guide the cationic water, and each of the second stop flanges 77 of the second gas and water channelling disc 70 is provided with a plurality of second openings 79 to collect the hydrogen molecules and guide the cationic water, so as to rapidly receive the hydrogen molecules produced by the cathode 60. In such a manner, the cationic water is moved upward and downward in the second collecting and guiding chambers 78 of the second gas and water channelling disc 70 and the hydrogen dissolving chambers 83 of the cover 80 to present a substantially successive S-shaped flow. Thus, the hydrogen molecules are lifted, and the cationic water is lowered to produce an blending reaction, so that more hydrogen molecules are dissolved into the cationic water.

In the preferred embodiment of the present invention, the ion membrane 50 is a proton exchange film and has a diameter greater than that of the anode 40 and that of the cathode 60. The first gas and water channelling disc 30 is provided with a protruding ring 362, the second gas and water channelling disc 70 is provided with a slot 72 mounted on the protruding ring 362 of the first gas and water channelling disc 30, and an O-ring "Q" is compressed between the protruding ring 362 of the first gas and water channelling disc 30 and the slot 72 of the second gas and water channelling disc 70, so that the ion membrane 50 is compressed by the protruding ring 362 of the first gas and water channelling disc 30 and the O-ring "Q", so as to stop a water flow, thereby preventing the cationic water and the anionic water from being mixed.

In the preferred embodiment of the present invention, the first gas and water channelling disc 30 has a periphery provided with a plurality of locating slots 35, and the second gas and water channelling disc 70 has a periphery provided with a plurality of locating inserts 71 inserted into the locating slots 35 of the first gas and water channelling disc 30, so that the second gas and water channelling disc 70 is positioned on the first gas and water channelling disc 30.

In the preferred embodiment of the present invention, an electric conductor 20 is mounted on the cathode 60 and connected with the base 10. The electric conductor 20 has a lower end provided with a conducting portion 26 locked in the conductive spacing tube 14 of the base 10. The base 10 is provided with two through holes 13, and the anode 40 is provided with two positive conducting portions 45 extending through the two through holes 13 of the base 10 and locked by two washers "R" and two nuts "N". Each of the two positive conducting portions 45 of the anode 40 is provided with an outer thread 46 extending through one of the two washers "R" and screwed by one of the two nuts "N". The connector 90 is provided with a hollow pillar 91 corresponding to the conductive spacing tube 14 of the base 10, a negative conducting shaft 98 is movably mounted in the hollow pillar 91 and connected to a negative wire (not shown), and an elastic member "S" is mounted in the hollow pillar 91 and biased between the hollow pillar 91 and the negative conducting shaft 98 to push the negative conducting shaft 98 to closely contact the conducting portion 26 of the electric conductor 20. The connector 90 is provided with two elastic positive conducting blades 99 corresponding to and closely contacting the two positive conducting portions 45 of the anode 40 and connected to a positive wire (not shown).

In the preferred embodiment of the present invention, the anode cavities 42 of the anode 40 and the cathode cavities 62 of the cathode 60 have a substantially V-shaped configuration.

In the preferred embodiment of the present invention, the first gas and water channelling disc 30 is provided with a first source water inlet passage 34 corresponding to the first water inlet ports 43 of the anode 40, and the second gas and water channelling disc 70 is provided with a second source water inlet passage 74 corresponding to the second water inlet ports 63 of the cathode 60. The first gas and water channelling disc 30 is provided with a plurality of anionic water outlet ports 36 and a plurality of anionic water outlet channels 361, and the second gas and water channelling disc 70 is provided with a plurality of cationic water outlet ports 75 and a plurality of cationic water outlet channels 76. The source water flows through the first water inlet ports 43 of the anode 40 into the first source water inlet passage 34 of the first gas and water channelling disc 30, and flows from the first water inlet ports 43 of the anode 40 into the anode cavities 42 of the anode 40 in a radiating manner, and finally flows out of the anionic water outlet channels 361 and the anionic water outlet ports 36 of the first gas and water channelling disc 30. The source water also flows through the second water inlet ports 63 of the cathode 60 into the second source water inlet passage 74 of the second gas and water channelling disc 70, and flows outward from the second water inlet ports 63 of the cathode 60 into the cathode cavities 62 of the cathode 60 in a radiating manner, and finally flows out of the cationic water outlet channels 76 and the cationic water outlet ports 75 of the second gas and water channelling disc 70.

In the preferred embodiment of the present invention, the first gas and water channelling disc 30 is provided with an annular stop edge 39 corresponding to the base 10 and forming the collecting and guiding space 391 between the base 10 and the first gas and water channelling disc 30, to collect the oxygen molecules and ozone and guide the anionic water, so as to rapidly receive the oxygen molecules and ozone produced by the anode 40, thereby preventing the oxygen molecules and ozone from being mixed with the cationic water.

In the preferred embodiment of the present invention, the first gas and water channelling disc 30 is provided with an annular projection 38 corresponding to the anionic water outlet ports 36 to lift a level of the anionic water, so that the ion membrane 50 is wet fully.

In the preferred embodiment of the present invention, the conductive spacing tube 14 of the base 10 is provided with an internal thread 141, and the lower end of the electric conductor 20 is provided with a lower stepped edge 24 located in the conductive spacing tube 14 of the base 10 and an external thread 23 screwed into the internal thread 141 of the conductive spacing tube 14. The cathode 60 has a center provided with a shaft hole 61, with the second water inlet ports 63 being located between the shaft hole 61 and the cathode cavities 62. The electric conductor 20 has an upper end provided with an upper stepped edge 22 resting on the cathode 60 and an outer thread 21 extending through an O-ring "Q" and the shaft hole 61 of the cathode 60, and a nut "N" is screwed onto the outer thread 21 of the electric conductor 20 to lock the cathode 60 onto the electric conductor 20. The electric conductor 20 is provided with an annular groove 25 located between the upper stepped edge 22 and the lower stepped edge 24, and an O-ring "Q" is retained in the annular groove 25 of the electric conductor 20 and compressed between the conductive spacing tube 14 of the base 10 and the electric conductor 20. The second gas and water channelling disc 70 has a bottom provided with a receiving recess 73 for receiving the nut "N" and the outer thread 21 of the electric conductor 20.

In the preferred embodiment of the present invention, the first gas and water channelling disc 30 is provided with two hollow posts 31 extending through the two through holes 13 of the base 10. Each of the two hollow posts 31 is provided with an aperture 311 allowing passage of each of the two positive conducting portions 45 of the anode 40. The aperture 311 of each of the two hollow posts 31 receives an O-ring "Q" to provide a water stop function. The first gas and water channelling disc 30 has a center provided with a spacing sleeve 32 which has an outer wall provided with a plurality of source water inlet ports 33, and the first source water inlet passage 34 are formed on a periphery of the source water inlet ports 33. Thus, the source water flows through the source water inlet ports 33 into the first source water inlet passage 34, and then flows outward from the first source water inlet passage 34 in a radiating manner. The spacing sleeve 32 of the first gas and water channelling disc 30 has a lower end provided with an annular groove 321 corresponding to the first spacing ring 15 of the base 10, and an O-ring "Q" is retained in the annular groove 321 of the first gas and water channelling disc 30.

In the preferred embodiment of the present invention, the anode 40 has a center provided with a shaft hole 41 having a diameter flush with that of the spacing sleeve 32 of the first gas and water channelling disc 30, and the ion membrane 50 has a center provided with a shaft hole 51 having a diameter flush with that of the spacing sleeve 32 of the first gas and water channelling disc 30. The hydrogen molecules permeate the ion membrane 50, and the oxygen molecules cannot permeate the ion membrane 50 during the electrolysis process, thereby preventing the oxygen molecules and ozone produced by the anode 40 from being mixed with the cationic water.

In the preferred embodiment of the present invention, the cationic water outlet connector 85 is connected with a cationic water outlet hose (not shown) so that the cationic water is delivered through the cationic water outlet connector 85 and carried outward from the cationic water outlet hose. The cationic water outlet connector 85 is provided with an annular groove 86, and an O-ring "Q" is retained in the annular groove 86 of the cationic water outlet connector 85 and compressed between the cationic water outlet connector 85 and the cationic water outlet hose.

In operation, referring to FIGS. 7 and 8 with reference to FIGS. 1-6, the source water in turn flows through the source water input joint 97 and the source water inlet chamber 95 into the source water inlet paths 152 of the first spacing ring 15. Then, most of the source water flows through the second water inlet ports 63 of the cathode 60 into the second source water inlet passage 74 of the second gas and water channelling disc 70, and flows into the cathode cavities 62 of the cathode 60 in a radiating manner. At the same time, a small part of the source water flows through the source water inlet ports 33 into the first source water inlet passage 34 of the anode 40, and then flows through the first water inlet ports 43 into the anode cavities 42 of the anode 40.

Referring to FIGS. 9-12 with reference to FIGS. 1-8, the source water is electrolyzed in the anode cavities 42 of the anode 40 to form oxygen $1a$ molecules, ozone and anionic water, and is electrolyzed in the cathode cavities 62 of the cathode 60 to form hydrogen molecules and cationic water. At this time, the ion membrane 50 is located between the anode 40 and the cathode 60, so that the hydrogen molecules permeate the ion membrane 50, and the oxygen molecules cannot permeate the ion membrane 50 during the electrolysis process, thereby preventing the oxygen molecules and ozone produced by the anode 40 from being mixed with the cationic water.

The hydrogen molecules produced in the cathode cavities 62 of the cathode 60 are carried by the cationic water to flow through the cationic water outlet channels 76, the cationic water outlet ports 75 and the second openings 79 of the second stop flanges 77 into the second collecting and guiding chambers 78, so that the hydrogen molecules are collected in the hydrogen dissolving chambers 83. At the same time, the cationic water is moved upward and downward in the second collecting and guiding chambers 78 of the second gas and water channelling disc 70 and the hydrogen dissolving chambers 83 of the cover 80 to present a substantially successive S-shaped flow. Thus, the hydrogen molecules are lifted, and the cationic water is lowered to produce an blending reaction, so that more hydrogen molecules are dissolved into the cationic water. In addition, more hydrogen molecules are forced by the pressure and dissolved again into the cationic water, thereby increasing the concentration of the hydrogen molecules in the cationic water. Finally, the cationic water containing the hydrogen molecules is delivered through the cationic water outlet connector 85 and drained outward from the cationic water outlet hose.

The oxygen molecules and ozone produced in the anode cavities 42 of the anode 40 are carried by the anionic water to flow through the anionic water outlet channels 361, the anionic water outlet ports 36 and the stop edge 39 into the first collecting and guiding chamber 391 of the first gas and water channelling disc 30, so that the oxygen molecules and ozone are collected in the first collecting and guiding chamber 391, thereby preventing the oxygen molecules and ozone from being mixed with the cationic water. Finally, the anionic water containing the oxygen molecules and ozone is delivered through the anionic water exit chamber 94 and the anionic water output joint 96 of the connector 90 and drained outward from the anionic water outlet hose. At this time, the annular projection 38 of the first gas and water channelling disc 30 lifts the level of the anionic water, so that the ion membrane 50 is wet fully.

Referring to FIGS. 13 and 14, the anode cavities 42 of the anode 40 and the cathode cavities 62 of the cathode 60 include multiple holes. The first gas and water channelling disc 30 is provided with a plurality of first spacing pieces 341 corresponding to the anode cavities 42 of the anode 40, and a plurality of anionic water flow channels 342 located between the first spacing pieces 341, so that the oxygen molecules and ozone produced in the anode cavities 42 of the anode 40 are rapidly carried away by the anionic water. The first spacing pieces 341 are arranged in a radiating manner. The second gas and water channelling disc 70 is provided with a plurality of second spacing pieces 741 corresponding to the cathode cavities 62 of the cathode 60, and a plurality of cationic water flow channels 742 located between the second spacing pieces 741, so that the hydrogen molecules produced in the cathode cavities 62 of the cathode 60 are rapidly carried away by the cationic water. The second spacing pieces 741 are arranged in a radiating manner.

Accordingly, more hydrogen molecules are dissolved into the cationic water by the blending reaction in the hydrogen dissolving chambers 83 of the cover 80 and by the increased pressure, so as to increase the concentration of the hydrogen molecules in the cationic water. In addition, the cathode cavities 62 of the cathode 60 are arranged in a radiating manner to form multiple cationic water flow channels, so that the hydrogen molecules produced in the cathode cavities 62 of the cathode 60 are quickly carried away by the cationic water, thereby preventing the hydrogen molecules from producing larger air bubbles due to a reunion phenomenon, so as to efficiently enhance the dissolved quantity (or solubility) of the hydrogen molecules. Further, the first collecting and guiding chamber 391 of the first gas and water channelling disc 30 corresponds to the anode 40 to rapidly collect the oxygen molecules and ozone produced by the anode 40, thereby preventing the oxygen molecules and ozone from being mixed with the cationic water. Further, the concentration of the hydrogen molecules in the cationic water is increased by more than 30%. Further, the hydrogen dissolving chambers 83, the first collecting and guiding chamber 391 and the second collecting and guiding chambers 78 are integrated and modularized, thereby decreasing the cost of fabrication. Further, the hydrogen molecule remixing device is assembled and disassembled quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A hydrogen molecule remixing device comprising:
a base;
a first gas and water channelling disc located above the base;
an anode located above the first gas and water channelling disc;
a cathode located above the anode;
an ion membrane located between the anode and the cathode;
a second gas and water channelling disc located above the cathode;
a cover combined with the base and located above the second gas and water channelling disc;
a cationic water outlet connector extending upward from the cover; and
a connector extending downward from the base;
wherein:
the first gas and water channelling disc is provided with a first collecting and guiding chamber corresponding to the base;
the second gas and water channelling disc is provided with a plurality of second collecting and guiding chambers corresponding to the cover;
the anode is provided with a plurality of first water inlet ports and a plurality of anode cavities;
the anode cavities are arranged in a radiating manner;
the cathode is provided with a plurality of second water inlet ports and a plurality of cathode cavities;
the cathode cavities are arranged in a radiating manner;
the connector is provided with a source water input joint and an anionic water output joint;
source water is respectively guided through the first water inlet ports of the anode and the second water inlet ports of the cathode into the anode cavities of the anode and the cathode cavities of the cathode;
the source water is electrolyzed in the anode cavities of the anode to form oxygen molecules, ozone and anionic water, and is electrolyzed in the cathode cavities of the cathode to form hydrogen molecules and cationic water;
the oxygen molecules and ozone in the anode cavities of the anode are carried by the anionic water into the first collecting and guiding chamber of the first gas and water channelling disc; and
the hydrogen molecules in the cathode cavities of the cathode are carried by the cationic water into the second collecting and guiding chambers of the second gas and water channelling disc, so that the hydrogen molecules and the cationic water produce an blending reaction in the second collecting and guiding chambers, and more hydrogen molecules are dissolved into the cationic water, to increase a concentration of the hydrogen molecules in the cationic water.

2. The hydrogen molecule remixing device of claim 1, wherein polarities of the anode and the cathode are interchanged.

3. The hydrogen molecule remixing device of claim 1, wherein:
the base has a top provided with a plurality of partitions which are arranged in a radiating manner, and a plurality of anionic water flow paths located between the partitions;
the base is provided with a conductive spacing tube, a first spacing ring surrounding the conductive spacing tube, and a second spacing ring surrounding the first spacing ring;
the base is provided with a plurality of first spacing ribs located between the first spacing ring and the conductive spacing tube and forming a plurality of source water inlet paths in the first spacing ring, and a plurality of second spacing ribs located between the second spacing ring and the first spacing ring and forming a plurality of anionic water outlet paths in the second spacing ring;
the second spacing ring is provided with a plurality of anionic water outlet ports corresponding to the anionic water flow paths; and
the anionic water outlet paths have a bottom provided with a plurality of anionic water outlet holes.

4. The hydrogen molecule remixing device of claim 3, wherein:
the top of the base is provided with an annular flange surrounding the partitions, and a connecting groove is formed between an inner wall of the base and the annular flange for connecting the first gas and water channelling disc;
the first gas and water channelling disc has an outer wall provided with an annular groove corresponding to the connecting groove of the base; and
an O-ring (Q) is compressed between the connecting groove of the base and the annular groove of the first gas and water channelling disc.

5. The hydrogen molecule remixing device of claim 1, wherein:
the base is provided with a mounting protrusion extending downward;
the mounting protrusion of the base is provided with at least one tenon;
the connector is provided with a mounting recess mounted on the mounting protrusion of the base; and
the mounting recess of the connector is provided with at least one mortise locked onto the tenon of the mounting protrusion.

6. The hydrogen molecule remixing device of claim 1, wherein the base is provided with an external thread, and the cover is provided with an internal thread screwed onto the external thread of the base.

7. The hydrogen molecule remixing device of claim 1, wherein the anode has a periphery provided with a plurality of first positioning portions, and the cathode has a periphery provided with a plurality of second positioning portions located on the first positioning portions of the anode to align the anode cavities of the anode with the cathode cavities of the cathode.

8. The hydrogen molecule remixing device of claim 1, wherein:
the cover is provided with a plurality of first stop flanges forming a plurality of hydrogen dissolving chambers in the cover;
the second gas and water channelling disc is provided with a plurality of second stop flanges forming the second collecting and guiding chambers in the second gas and water channelling disc;
each of the first stop flanges of the cover is provided with a plurality of first openings to collect the hydrogen molecules and guide the cationic water;
each of the second stop flanges of the second gas and water channelling disc is provided with a plurality of second openings to collect the hydrogen molecules and guide the cationic water; and
the cationic water is moved upward and downward in the second collecting and guiding chambers of the second gas and water channelling disc and the hydrogen dissolving chambers of the cover to present a substantially successive S-shaped flow.

9. The hydrogen molecule remixing device of claim 1, wherein:
the ion membrane is a proton exchange film and has a diameter greater than that of the anode and that of the cathode;
the first gas and water channelling disc is provided with a protruding ring;
the second gas and water channelling disc is provided with a slot mounted on the protruding ring of the first gas and water channelling disc; and
an O-ring is compressed between the protruding ring of the first gas and water channelling disc and the slot of the second gas and water channelling disc.

10. The hydrogen molecule remixing device of claim 1, wherein the first gas and water channelling disc has a periphery provided with a plurality of locating slots, and the second gas and water channelling disc has a periphery provided with a plurality of locating inserts inserted into the locating slots of the first gas and water channelling disc.

11. The hydrogen molecule remixing device of claim 1, wherein:
an electric conductor is mounted on the cathode and connected with the base;
the electric conductor has a lower end provided with a conducting portion (26) mounted in a conductive spacing tube of the base;
the base is provided with two through holes;
the anode is provided with two positive conducting portions extending through the two through holes of the base;
the connector is provided with a hollow pillar corresponding to the conductive spacing tube of the base;
a negative conducting shaft is movably mounted in the hollow pillar and connected to a negative wire;
an elastic member (S) is mounted in the hollow pillar and biased between the hollow pillar and the negative conducting shaft to push the negative conducting shaft to closely contact the conducting portion of the electric conductor; and
the connector is provided with two elastic positive conducting blades corresponding to the two positive conducting portions of the anode and connected to a positive wire.

12. The hydrogen molecule remixing device of claim 1, wherein the anode cavities of the anode and the cathode cavities of the cathode have a substantially V-shaped configuration.

13. The hydrogen molecule remixing device of claim 1, wherein:
the anode cavities of the anode and the cathode cavities of the cathode include multiple holes;

the first gas and water channelling disc is provided with a plurality of first spacing pieces corresponding to the anode cavities of the anode, and a plurality of anionic water flow channels located between the first spacing pieces;

the first spacing pieces are arranged in a radiating manner;

the second gas and water channelling disc is provided with a plurality of second spacing pieces corresponding to the cathode cavities of the cathode, and a plurality of cationic water flow channels located between the second spacing pieces; and the second spacing pieces are arranged in a radiating manner.

14. The hydrogen molecule remixing device of claim 1, wherein:

the first gas and water channelling disc is provided with a first source water inlet passage corresponding to the first water inlet ports of the anode;

the second gas and water channelling disc is provided with a second source water inlet passage corresponding to the second water inlet ports of the cathode;

the first gas and water channelling disc is provided with a plurality of anionic water outlet ports and a plurality of anionic water outlet channels;

the second gas and water channelling disc is provided with a plurality of cationic water outlet ports and a plurality of cationic water outlet channels;

the source water flows through the first water inlet ports of the anode into the first source water inlet passage of the first gas and water channelling disc, and flows from the first water inlet ports of the anode into the anode cavities of the anode in a radiating manner, and finally flows out of the anionic water outlet channels and the anionic water outlet ports of the first gas and water channelling disc; and the source water flows through the second water inlet ports of the cathode into the second source water inlet passage of the second gas and water channelling disc, and flows outward from the second water inlet ports of the cathode into the cathode cavities of the cathode in a radiating manner, and finally flows out of the cationic water outlet channels and the cationic water outlet ports of the second gas and water channelling disc.

15. The hydrogen molecule remixing device of claim 14, wherein the first gas and water channelling disc is provided with an annular stop edge corresponding to the base and forming the collecting and guiding space between the base and the first gas and water channelling disc, to collect the oxygen molecules and ozone and guide the anionic water.

16. The hydrogen molecule remixing device of claim 14, wherein the first gas and water channelling disc is provided with an annular projection corresponding to the anionic water outlet ports.

* * * * *